C. H. BURCKHALTER.
LOOM ATTACHMENT.
APPLICATION FILED JUNE 16, 1914.
1,147,675.
Patented July 20, 1915.
Fig. 1.
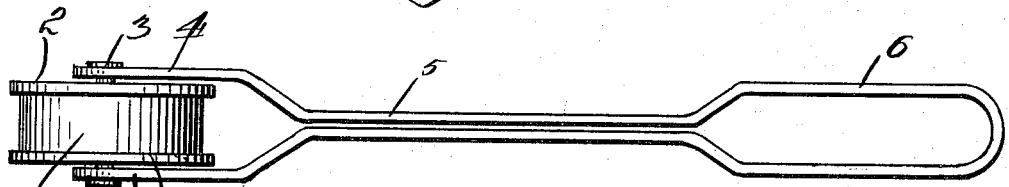
Fig. 2.
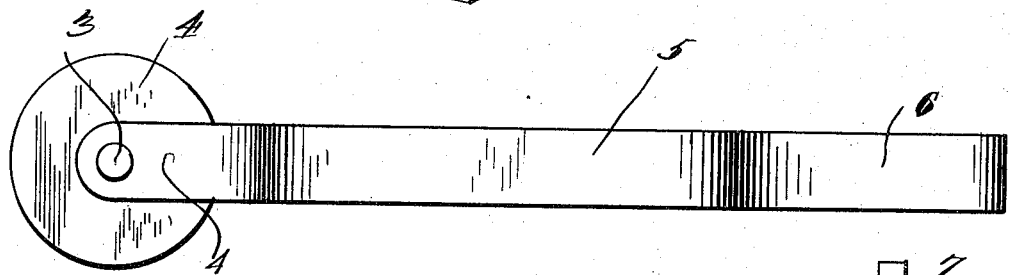
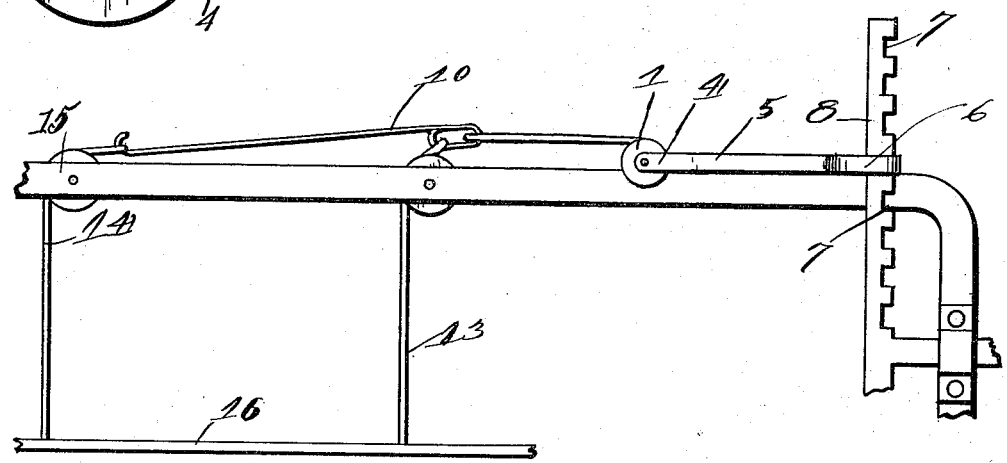
Fig. 3.
Witnesses
Inventor
C. H. Burckhalter,
By
Attorney

UNITED STATES PATENT OFFICE.

CHARLES H. BURCKHALTER, OF BATH, SOUTH CAROLINA.

LOOM ATTACHMENT.

1,147,675.  Specification of Letters Patent.  Patented July 20, 1915.

Application filed June 16, 1914.  Serial No. 845,403.

*To all whom it may concern:*

Be it known that I, CHARLES H. BURCKHALTER, a citizen of the United States, residing at Bath, in the county of Aiken and State of South Carolina, have invented certain new and useful Improvements in Loom Attachments, of which the following is a specification.

This invention relates to shedding devices for full turn leno, and one of the principal objects of the invention is to provide a simple device to give a double lift on the harness, and so insure a shed as large as the plain shed.

The foregoing and other objects may be attained by means of the construction illustrated in the accompanying drawing, in which—

Figure 1 is a top plan view of the shedding device disconnected from the harness, Fig. 2 is a side elevation of the same, and Fig. 3 is a view showing the connection of the device to the harness and dobby wire.

Referring to the drawing, the numeral 1 designates a spool which may be of wood or of metal, said spool being provided with side flanges 2 so that the leather strap which moves around the spool will not slide off. The spool 1 is mounted on a spindle 3 connected to the spaced ends 4 of a stirrup 5, said stirrup being formed of a strip of sheet metal of the desired gage and comprising the two parallel members 5 and the loops 6 at one end and the base members 4 at the opposite ends.

The loop 6 engages the notches 7 in the dobby lever 8, and the strap 9 extends around the spool 1 and is connected to the dobby wire 10 at one end while the opposite end is connected to a hook 11 on the idler pulley 12. The harness strap 13 extends partially around the pulley 12 and is connected to a hook on the dobby wire 10. Connected to the opposite end of the dobby wire 10 is a strap 14 which extends around a pulley 15 and is connected to the harness 16, as is also the strap 13.

From the foregoing it will be obvious that the shedding device as described will give a double lift on the harness and thus insure a shed as large as the plain shed.

Various changes may be made in the details of construction without departing from the spirit and scope of the invention as defined in the claim.

What is claimed is:

A shedding device for full turn leno work comprising a stirrup having a loop at one end and the opposite ends spaced apart, a spool journaled between said spaced ends, said stirrup having the intermediate portion between the loop and the spaced ends brought together, a dobby lever provided with a series of notches to be engaged by the loop of the stirrup, a dobby wire, an idler, a strap extending around said spool and connected at one end to the dobby wire, and the opposite end connected to the idler, a pulley, and harness straps passing around said pulley and said idler.

In testimony whereof I affix my signature in presence of two witnesses.

CHARLIE H. BURCKHALTER.

Witnesses:
J. F. SOFGE,
M. W. PERRY.

Copies of this patent may be obtained for five cents each, by addressing the "Commissioner of Patents, Washington, D. C."